(12) United States Patent
Beyers

(10) Patent No.: US 8,144,602 B2
(45) Date of Patent: Mar. 27, 2012

(54) NETWORK LOAD TESTER WITH REAL-TIME DETECTION AND RECORDING

(75) Inventor: Timothy M. Beyers, San Francisco, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 350 days.

(21) Appl. No.: 12/186,976

(22) Filed: Aug. 6, 2008

(65) Prior Publication Data

US 2010/0034100 A1 Feb. 11, 2010

(51) Int. Cl.
*H04L 1/00* (2006.01)
(52) U.S. Cl. ........................ 370/242
(58) Field of Classification Search ................... 370/229, 370/230, 235, 541–253
See application file for complete search history.

(56) References Cited

U.S. PATENT DOCUMENTS

| | | | | |
|---|---|---|---|---|
| 5,778,338 A * | 7/1998 | Jacobs et al. | | 704/223 |
| 6,584,098 B1 * | 6/2003 | Dutnall | | 370/354 |
| 6,721,320 B1 * | 4/2004 | Hoglund et al. | | 370/392 |
| 7,636,321 B1 * | 12/2009 | Iannaccone et al. | | 370/252 |
| 2002/0156918 A1 * | 10/2002 | Valdevit et al. | | 709/238 |
| 2005/0025152 A1 * | 2/2005 | Georgiou et al. | | 370/394 |
| 2005/0060598 A1 * | 3/2005 | Klotz et al. | | 714/4 |
| 2005/0063396 A1 * | 3/2005 | Yu | | 370/401 |
| 2005/0117562 A1 * | 6/2005 | Wrenn | | 370/351 |
| 2006/0075165 A1 * | 4/2006 | Hui et al. | | 710/58 |
| 2006/0262784 A1 * | 11/2006 | Cheethirala et al. | | 370/389 |

\* cited by examiner

*Primary Examiner* — Ricky Ngo
*Assistant Examiner* — Wei-Po Kao
(74) *Attorney, Agent, or Firm* — Volentine & Whitt, PLLC

(57) ABSTRACT

A load tester is configured to generate traffic streams for testing a network. The traffic streams can include one or more stream objects. Each stream object can be characterized by a unique identifier and can include a fixed number of frames. The frames can share the same S_ID and D_ID while being characterized by a unique sequence count. The load tester can receive a plurality of frames, all or some of which belong to a stream object, and analyze the received frames in real-time to identify the occurrence of one or more errors such as out-of-order frame errors, dropped frame errors, and misdirected frame errors. The different types of errors can be individually recorded.

18 Claims, 5 Drawing Sheets

NETWORK LOAD TESTER WITH REAL-TIME DETECTION AND RECORDING

BACKGROUND OF THE INVENTION

1. The Field of the Invention

The present invention relates generally to networking systems. More particularly, embodiments of the invention relate generally to the testing of high speed data transmission systems and components

2. The Related Technology

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANs")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible testing mechanisms.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to systems and methods for testing communication networks. According to one embodiment, a method for testing a network begins by receiving multiple frames from a switch. At least some of the frames belong to a first stream object characterized by a unique identifier and each frame is characterized by a unique sequence count. Upon receiving the frames, they are analyzed in real-time to identify the occurrence of errors. The errors are then recorded according to error type. The types of errors recorded can include out-of-order frame errors, dropped frame errors, and misdirected frame errors.

According to another embodiment, a network load tester for testing a network includes a traffic stream table storing a stream record for each of multiple traffic streams. Each stream is characterized by a unique identifier and includes a fixed number of data frames. A traffic profile engine is operably coupled to the traffic stream table and generates multiple traffic profiles, each traffic profile including one or more traffic streams. A transmitter is operably coupled to the traffic profile engine and transmits one or more of the generated traffic profiles to a switch.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention generally relate to networking systems, including the testing of high speed data transmission systems and components. Embodiments of the invention may be used in other contexts unrelated to testing systems and components and/or unrelated to high speed data transmission.

I. Example Networking System

Figure 1:
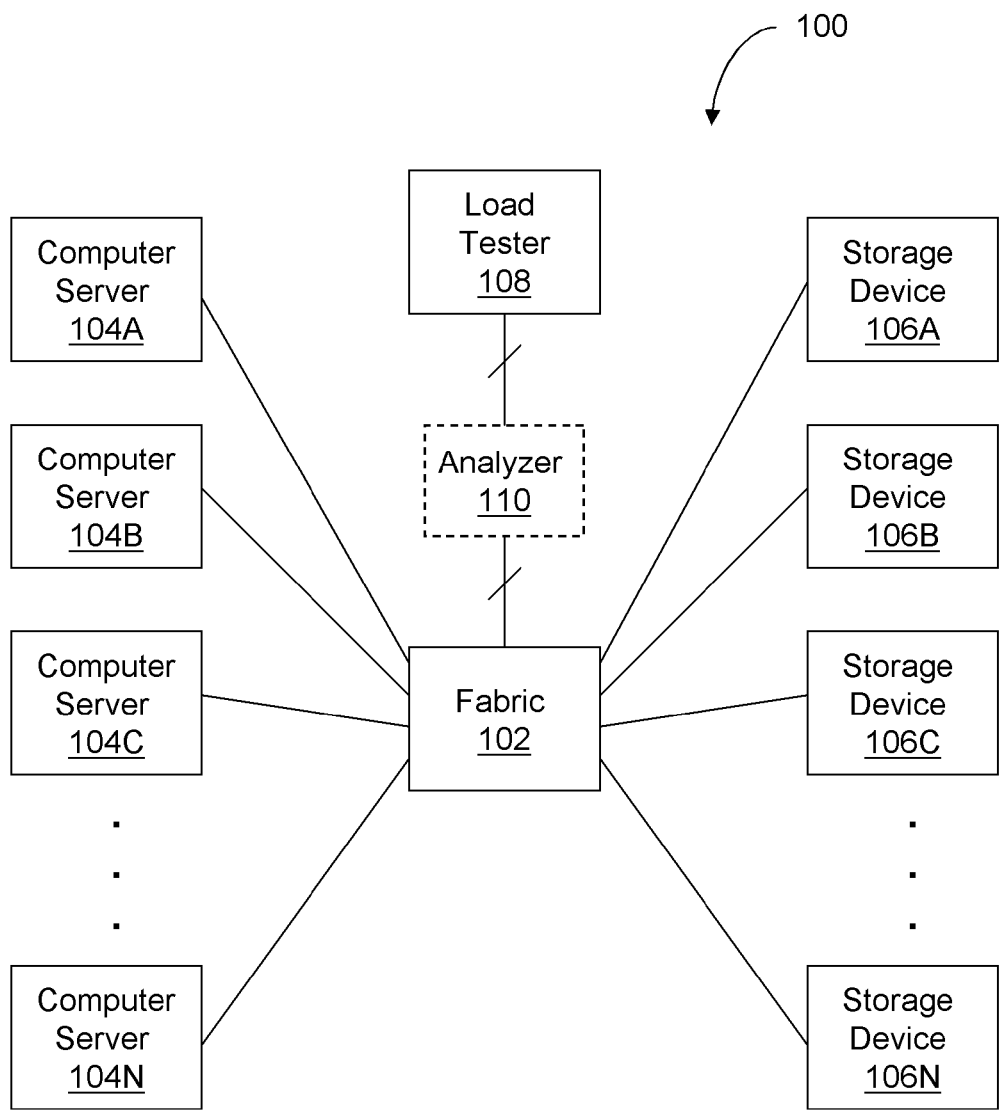
FIG. 1 illustrates an example communication network.

FIG. 1 is a block diagram of an example networking system 100 in which embodiments of the invention can be implemented. The system 100 may comprise, for instance, a storage area network ("SAN"), and includes a switching fabric 102, one or more computer servers 104A-104N (collectively referred to herein as "computer servers 104"), and one or more storage devices 106A-106N (collectively referred to herein as "storage devices 106"). In some embodiments, the computer servers 104 respond to requests from client devices (not shown), such as read and write requests, by communicating over the switching fabric 102 with the storage devices 106 to read data from, or write data to, the storage devices 106.

According to embodiments of the invention, the switching fabric 102 may include one or more Fibre Channel ("FC") switches configured to route data between servers/devices in the networking system 100, as well as multiple physical paths between switches and/or devices of the system 100. The switches can thereby load balance data communicated through the system 100 across the redundant physical paths and otherwise optimize interconnections for improved system performance. For example, the FC switches can implement one or more load-balancing algorithms that can include hashing certain Fibre Channel header data (e.g., source ID, destination ID, etc.) associated with data packets sent through the system to determine which physical path the data packets are sent through en route to their destination.

The networking system 100 may include one or more nodes. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

Each of the nodes in the system 100 may include one or more ports. For example, in the FC switched fabric topology disclosed in FIG. 1, each of the servers 104 and/or storage devices 106 may include a node port ("N_port"), while the switches within the fabric 102 each include one or more fabric ports ("F_port"). In other FC topologies, however, each of the servers 104 and/or storage devices 106 may include a node loop port ("NL_port") while the switches include one or more fabric loop ports ("FL_port"). Alternately or additionally, each of the switches in the fabric 102 can include one or more E_ports, EX_ports, TE_ports, or the like or any combination thereof.

In some embodiments, a signal (such as, an electrical signal, an optical signal, and the like) may be used to send and/or receive network messages over at least a portion of the network 100. As used herein, a "network message" includes, but is not limited to, a packet; a datagram; a frame; a data frame; a command frame; an ordered set; a sequence; an exchange; a stream; a stream object; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like.

According to embodiments of the invention, the network system 100 additionally includes one or more load testers 108 operably connected to the system 100 through the fabric 102 via one or more ports. One or more analyzers 110 may optionally be implemented in the system 100 as well, although this is not required in all embodiments. As will be described in greater detail below, the load tester 108 can be configured to, among other things, generate and send a network message—such as a stream object or exchange—through the system 100, monitor a received stream object or exchange or other network message and identify dropped/out-of-order/misdirected frames in real-time, trigger an analyzer to capture data associated with the dropped/out-of-order/misdirected frames, and the like or any combination thereof.

As already mentioned above, FIG. 1 illustrates an FC switched fabric topology in which embodiments of the invention can be implemented. One skilled in the art will appreciate, with the benefit of the present disclosure, that embodiments of the invention can be implemented in other FC topologies as well, including FC arbitrated loop topologies. Having said that, embodiments of the invention are not limited to FC topologies at all and can alternately or additionally be implemented in conjunction with other protocol topologies.

II. Example Load Tester

Figure 2:
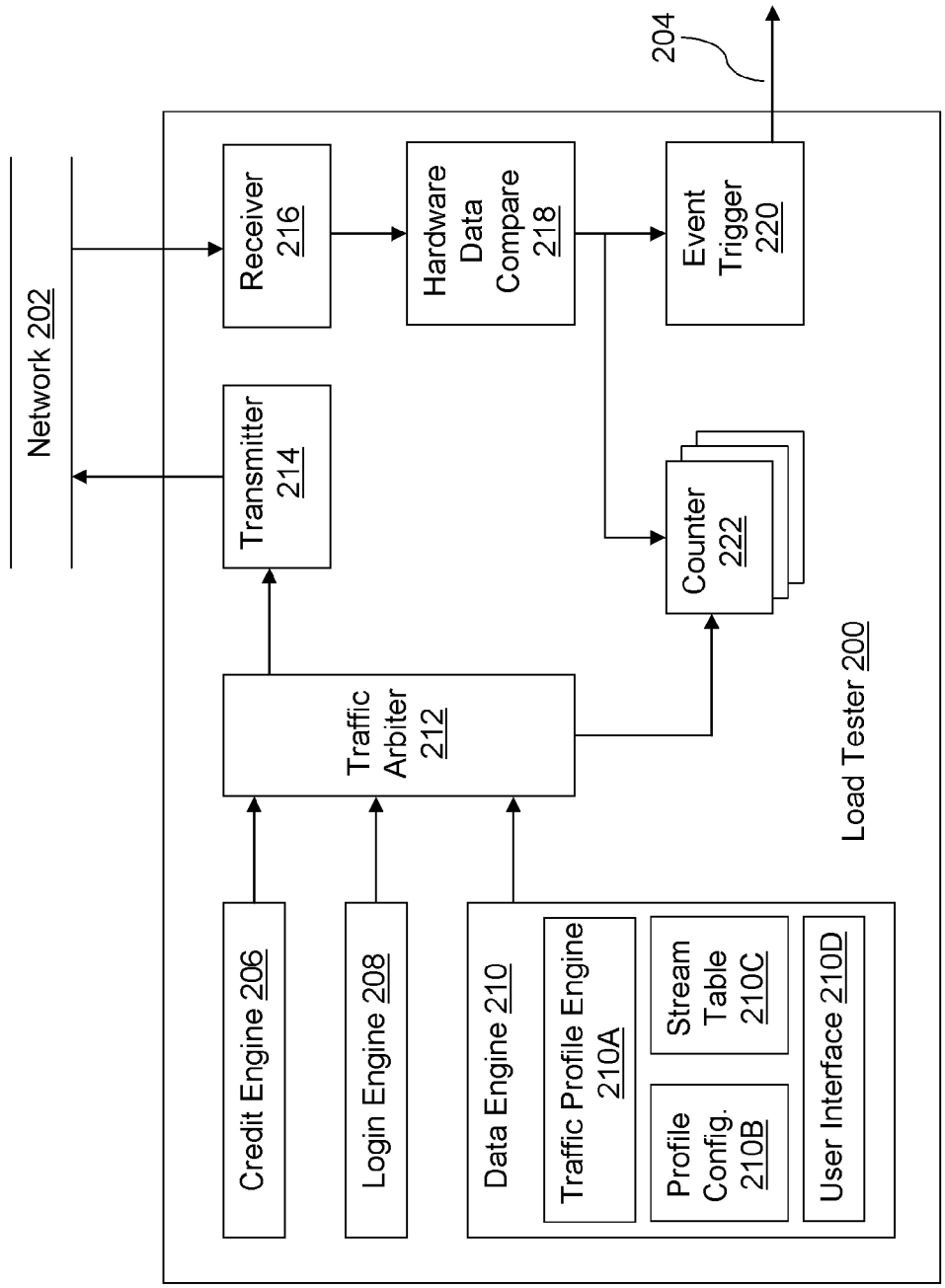
FIG. 2 illustrates an example load tester that can be implemented to test a communication network.

With additional reference to FIG. 2, one embodiment of a load tester 200 is disclosed that may correspond to the load tester 108 of FIG. 1. The load tester 200 is configured to communicate with a network 202, which may include the fabric 102 of FIG. 1, for example. Optionally, the load tester 200 can be configured to communicate with a network analyzer (e.g., the analyzer 110 of FIG. 1), as indicated by the arrow 204, although the network analyzer does not necessarily become part of a communication link.

As shown, the load tester 200 includes a plurality of modules that can be implemented in hardware, software, or a combination of hardware and software. For instance, the load tester 200 can include a credit engine 206, a login engine 208, a data engine 210, a traffic arbiter 212, and a transmitter 214 for transmitting network messages onto the network 202. Additionally, the load tester 200 can include a receiver 216, a hardware data compare ("HDC") 218, an event trigger 220, and one or more counters 222 for receiving network messages from the network 202. Although the modules 206-214 have been initially described in the context of transmitting network messages and the modules 216-222 have been initially described in the context of receiving network messages, it will be appreciated by those skilled in the art that one or more of the modules 206-214 may alternately or additionally provide functionality with respect to receiving network messages while one or more of the modules 216-222 may alternately or additionally provide functionality with respect to transmitting network messages.

In greater detail, the login engine 208 may be configured to generate one or more login network messages for logging into one or more other nodes in the network 202 prior to establishing a communication link. The generated login network messages can include, for example, a fabric login ("FLOGI"), a port login ("PLOGI"), a process login ("PRLI"), and the like. The login engine 208 can additionally exchange one or more parameters with the node which relate to aspects of any communication between the load tester 200 and the node. The different parameters can include the FC-PH version support, classes of service supported, frame size, type of ACK support (e.g., single frame, multiple frame), number of buffer credits, addressing, time out values, error recovery policies, number of sequences, and the like or any combination thereof.

The credit engine 206 can operate in the context of implementing flow control after a communication link has been established with another node in the network 202. In one example embodiment, the load tester 200 allocates buffer credits to each node with which a link has been established. Each node sends frames to the load tester 200 only so long as the buffer credits allocated to the node exceed zero. To that end, the credit engine 206 can be configured to send one or more receiver ready ("R_RDY") signals to the node whenever frames received from the node are processed. In turn, that permits the node to keep track of whether the load tester 200 is ready to receive any additional frames.

The data engine 210 is configured to generate a test signal (e.g., one or more network messages) to send out to the network 202 for the purpose of testing various aspects of the network 202. Various sub-modules 210A-210D can be included within the data engine 210 to provide the features and functionality described herein. For instance, traffic profile engine 210A can be configured to generate a plurality of traffic profiles. In one embodiment, the traffic profile engine 210A can generate eight traffic profiles, although in other embodiments the traffic profile engine 210A can generate more or less than eight traffic profiles. Each traffic profile can include one or more traffic streams, where a traffic stream is defined as a uni-directional exchange between a source N_Port and a destination N_Port.

Each traffic stream can include one or more data frames and can be characterized by an identifier unique to the source N_Port ("S_ID"), an identifier unique to the destination N_Port ("D_ID"), and a stream identifier. The number of data frames in each traffic stream can be fixed or user-configurable. More than one traffic stream can exist with the same S_ID and D_ID. However, the stream identifier is unique to each traffic stream to allow statistics to be tracked for the traffic stream. The unique stream identifier can include an originator exchange identifier ("OX_ID"), although this is not required in all embodiments. The traffic streams can be stored in the stream table 210C, which can alternately or additionally store stream-specific data for each stream, such as the S_ID, D_ID, and OX_ID, and/or the data needed to send the next frame of that stream. In some embodiments, the stream table 210C stores 1024 different data streams, although there may be more than 1024 different data streams or less than 1024 different data streams in other embodiments of the invention.

The profile configuration module 210B includes one or more user-specified and/or default parameters associated with each of the traffic profiles. One or more of the parameters within the profile configuration module 210B can be modified by a user through the user interface 210D. The parameters stored in the profile configuration module 210B can include, for each traffic profile, one or more of: frame size (e.g., fixed or variable), profile type (e.g., continuous or burst), header, payload contents (e.g., fixed, incrementing, decrementing, rotate shift right, rotate shift left, random, CJTPAT, CRPAT), error injection type (e.g., CRC, CV, RD, Delimiter), error injection frequency, or the like or any combination thereof.

Although not shown, the load tester 200 can include multiple physical N_Ports, one or more of which can be configured to support a plurality of N_Port ID Virtualizations ("NPIVs"), although not required in all embodiments. Where NPIVs are supported, this allows the load tester to send frames with different S_IDs into the same port and/or to receive frames with different D_IDs at the same port. The user may optionally configure one or more parameters related to each physical N_Port. Alternately or additionally, one or more default parameters may be applied to each physical N_Port. The parameters for each physical N_Port that can be configured by the user or that may be default parameters can include, for example, the link rate (e.g., 1 G, 2 G, 4 G, 8 G) and transmitter OX_ID generation mode (e.g., dynamic or pre-allocated).

In dynamic OX_ID generation mode, subsequent frames generated by the traffic profile engine 210A have a new OX_ID. In allocated OX_ID mode, all transmitter traffic streams for a given N_Port are given the same unique OX_ID in the stream table 210C prior to starting a test. Thus, for a given S_ID, D_ID, and OX_ID, and if the switches implement a load-balancing hash algorithm that is functioning properly, all frames should take the same physical path and arrive at their destination in order. When this mode is selected, the number of frames per exchange (or per stream object) can be a fixed number. The fixed number of frames may be 32 in some embodiments, although the fixed number of frames may be more or less than 32 in other embodiments.

Returning to FIG. 2, traffic arbiter 212 arbitrates network messages received from the credit engine 206, login engine 208, and data engine 210 to determine which network messages will be transmitted to the network 202 and/or in what order. In some embodiments of the invention, the traffic arbiter 212 can include a state machine. Upon selecting a network message from among one or more of engines 206-210, the traffic arbiter 212 forwards the selected network message to the transmitter 214 for transmission to the network 202.

Although not shown, the load tester 200 may additionally include one or more other modules, including, but not limited to, a cyclic redundancy check ("CRC") jammer, a scrambler, an 8B/10B encoder, and/or a test module.

On the receive side, the receiver 216 receives network messages from one or more nodes in the network 202. The network messages received by receiver 216 can include network messages transmitted by the transmitter 214. Alternately or additionally, the network messages can be received from one or more other load testers in the network 202.

The HDC 218 can include hardware configured to analyze receive data to identify errors, including out-of-order frame errors, dropped/missing frame errors, misdirected frame errors, and the like or any combination thereof According to embodiments of the invention, the identification of errors by the HDC 218 can include CRCs, and/or other analysis of data received from the network 202, including verifying received data against expected data. According to embodiments of the invention, the implementation of the error check in hardware reduces and/or eliminates any performance penalty on the data transfer while error checking, allowing real-time compare at up to the full line rate of the network 202.

As already mentioned, the errors identifiable by the HDC module 218 can include out-of-order frame errors, missing frame errors, and/or misdirected frame errors. An out-of-order frame error occurs when a frame in a sequence of frames is received in a different order than it was transmitted. A missing frame error occurs when at least one of the frames of a sequence is not received. The identification of a missing frame error may occur in response to any one of a variety of events, including receiving the last frame in a sequence without receiving one or more previous frames, or receiving the first frame in a subsequent sequence prior to receiving at least one frame from a prior sequence. A misdirected frame error occurs when a frame is received by an N_Port with a D_ID that is different than the D_ID of the frame.

According to embodiments of the invention, the different types of errors can be separately recorded to maintain individual error counts for each error type. In one embodiment, this can be accomplished by incrementing a corresponding counter from among the one or more counters 222 every time the HDC module 218 identifies an error. Alternately or additionally, upon identifying an error, including an out-of-order frame error, a missing frame error, or a misdirected frame error, event trigger 220 can immediately send a trigger event to a network analyzer or otherwise trigger the network analyzer to begin capturing data associated with the error. Accordingly, the real-time error identification provided by the HDC module 218 allows the immediate capture of relevant data which facilitates the identification and debug of problems in the network 202.

As indicated in the previous paragraph, the counters 222 can include an out-of-order counter frame, a missing frame counter and a misdirected frame counter. Alternately or additionally, the counters 222 can include counters to track one or more of transmitted frames and transmitted bytes on a per physical transmitter N_Port, per traffic profile, and/or per login basis. The transmitter N_Port transmitted frames and transmitted bytes counters are reset prior to the start of each test in some embodiments.

Alternately or additionally, for each receiver N_Port, the counters 222 can track received frames, received bytes, frames with CRC errors, bytes with errors, code violations, running disparity errors, and/or misdirected frames. Alternately or additionally, for each receiver traffic stream, the counters 222 can track the received frames; the minimum, maximum, and total latency; out-of-order frame errors, and/or dropped frame errors. The counters for each receiver N_Port and each receiver traffic stream can be reset prior to the start of each test in some embodiments.

III. Port Topologies

Figure 3A:
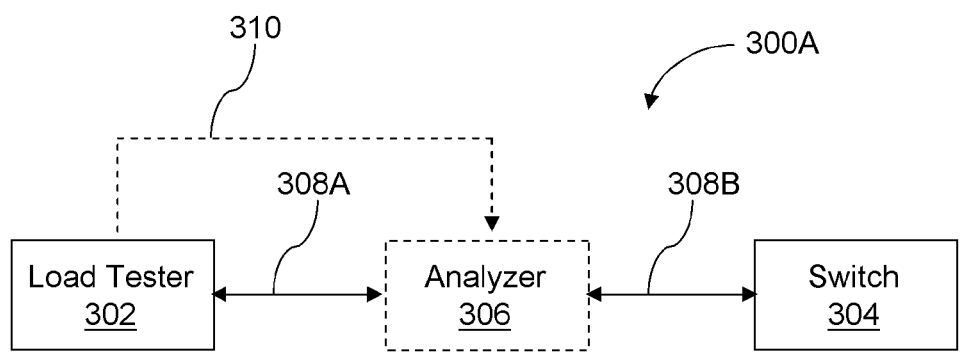
FIGS. 3A-3D depict various port topologies for coupling a load tester to a communication network.

Turning now to FIGS. 3A-3D, various port topologies are disclosed wherein the load testers 108, 200 of FIGS. 1 and 2 can be implemented. In particular, FIG. 3A illustrates a self-test port topology 300A that includes load tester 302, switch 304, and optional analyzer 306. The load tester 302 and switch 304 can be operably connected via one or more physical channels 308A and 308B (also referred to herein as "channel 308"). The channel 308 can include one more fiber optic cables and one or more fiber optic transceiver or transponder modules, for example.

In the self-test port topology 300A of FIG. 3A, the S_ID and the D_ID of the traffic stream transmitted by the load tester 302 to the switch 304 are the same. As a result, the switch 304 receives the traffic stream from a particular N_Port of the load tester 302 and, if functioning properly, routes it back to the same N_Port the traffic stream was received from. According to this embodiment, the traffic stream is received by, and sent from, a single physical N_Port of the switch 304. Consequently, any errors that arise are likely to have been caused by the channel 308 or by the particular N_Port of the switch 304 that received and sent the traffic stream back to the load tester 302. Thus, the self-test port topology 300A can be used to test a particular N_Port of the switch 304 and/or the fiber optic cables or modules included in the physical channel 308.

Optionally, when the load tester 302 identifies an error, it can send a trigger 310 to the analyzer 306 or otherwise trigger the analyzer 308 to begin collecting data that may be associated with the error. For example, the analyzer 308 can collect the data going into the switch 304 from the load tester 302, as well as the data coming out of the switch 304 and intended for the load tester 302. The captured data can then be analyzed to help pinpoint the faulty component in the communication link.

Figure 3B:
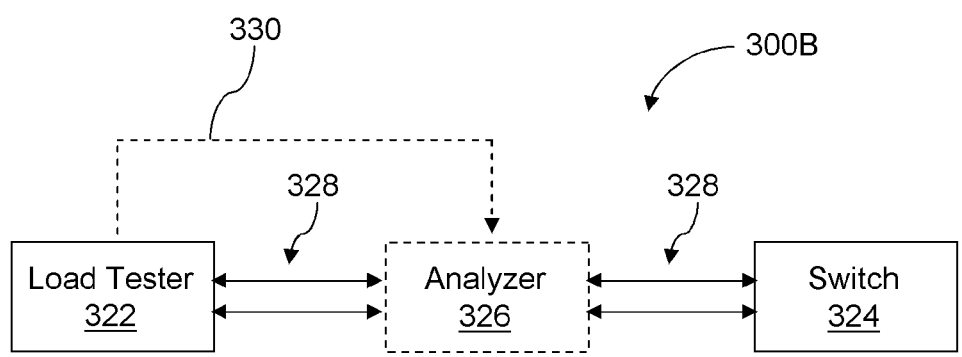

FIG. 3B discloses a pairport topology 300B that similarly includes a load tester 322, switch 324, and optional analyzer 326, operably interconnected via one or more physical channels 328. In the topology of FIG. 3B, an N_Port of the load tester 322 logs in to its corresponding pairport and vice versa. The two ports then send traffic to each other via the switch 324. The pairport topology 300B can be used to check data ports within the switch 324, for example. Optionally, a trigger 330 can be sent to the analyzer 326 to capture data when the load tester 322 encounters errors.

Figure 3C:
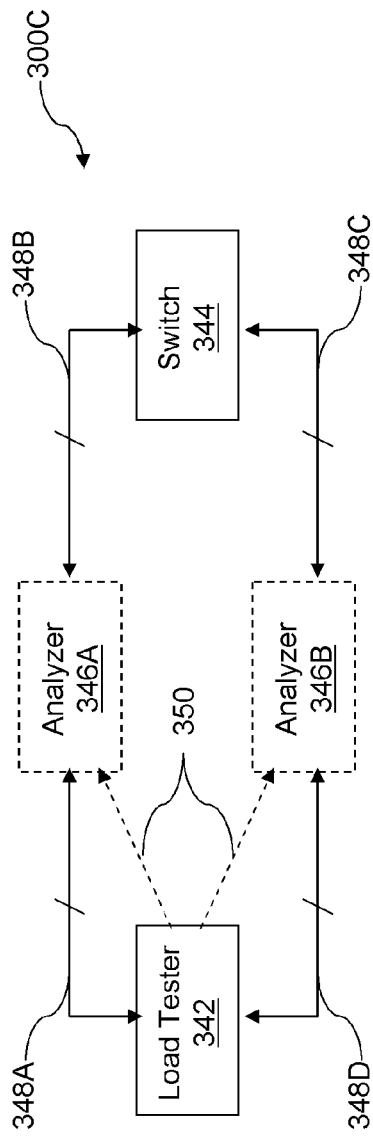

FIG. 3C discloses a multi-port topology 300C including a load tester 342, switch 344, and optional analyzers 346A and 346B operably connected via a plurality of channels 348A-348D. Optionally, a trigger 350 can be sent to one or both of the analyzers 346A, 346B to capture data when the load tester 342 encounters errors.

In some embodiments of the invention, each of the load tester 342, switch 344, analyzer 346A, and analyzer 346B includes sixteen physical N_Ports. For each link established between an N_Port of the load tester 342 and an N_Port of the switch 344, the analyzer 346A or 346B provides two N_Ports (when an analyzer is desired). Consequently, two analyzers with sixteen N_Ports each can be provided when all sixteen N_Ports of the load tester 342 are configured to communicate with all sixteen N_Ports of the switch 344 (and when analyzer functions are desired).

It is appreciated that the multi-port topology 300C of FIG. 3C can be configured as a fully mesh topology or a partially mesh topology. In the fully mesh topology, each physical N_Port of the load tester 342 logs in to all other physical N_Ports of the load tester 342 such that all N_Ports can communicate with all other N_Ports. In the partially mesh topology, all physical N_Ports in a first group log into all physical N_Ports in a second group for unidirectional or bidirectional traffic.

Figure 3D:
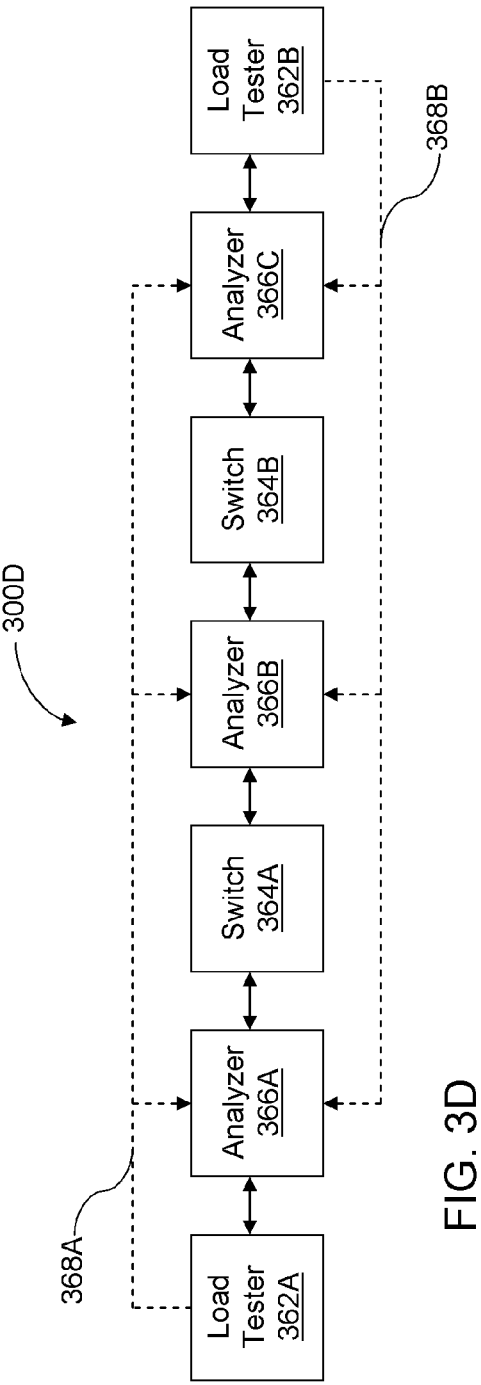

FIG. 3D discloses a fourth topology 300D including a plurality of load testers 362A, 362B, a plurality of switches 364A, 364B, and optionally a plurality of analyzers 366A-366C. The topology of FIG. 3D can be used to check the inter-switched links ("ISL") between two or more switches, for example, to determine whether the hashing or other routing algorithm implemented in the switches 364A, 364B for routing traffic is functioning properly. Optionally, when an error is detected by either of the load testers 362A, 362B, triggers 368A, 368B can be sent to one or all of the analyzers 366A-366C to capture data that may be associated with the error and/or that can be used to debug the error.

IV. Load Tests

Figure 4:
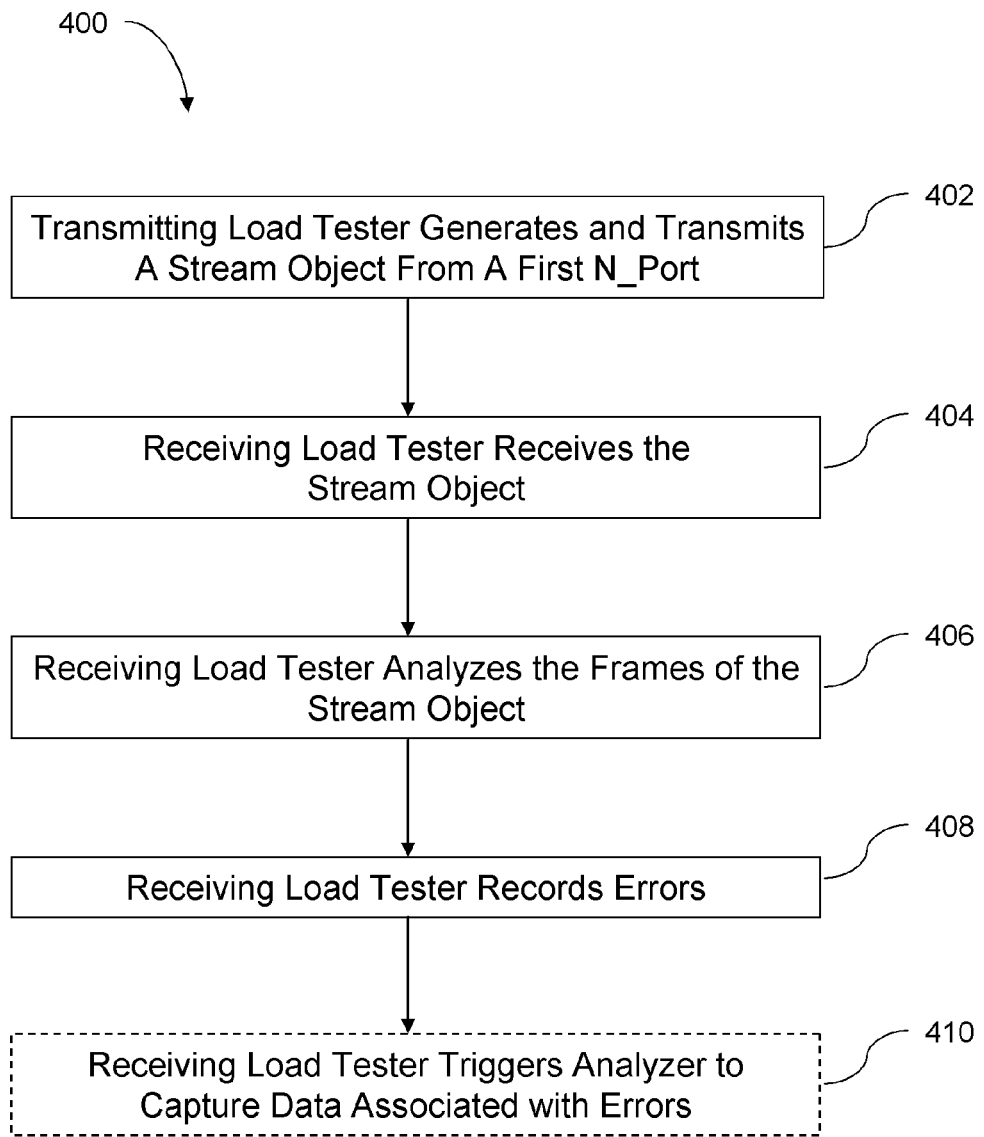
FIG. 4 is a flow chart illustrating one embodiment of a method for testing a communication network.

Turning now to FIG. 4, one embodiment of a method 400 for testing a network is disclosed that may be implemented by the load testers described with respect to FIGS. 1-3D. For instance, the method 400 can be performed by a load tester according to the embodiment 200 of FIG. 2. The load test method 400 can be performed by a single load tester or by multiple load testers and can be used to test switches, cables, transceiver/transponder modules, and/or other components included within the network environment 100 of FIG. 1.

The method 400 begins when a transmitting load tester generates and transmits 402 a stream object onto a network from a first N_Port. As used herein, a "stream object" is a network message that includes a unidirectional exchange characterized by an OX_ID, the exchange including a single sequence, the sequence including a fixed number of frames, each frame including a unique sequence count and characterized by the same S_ID (associated with the first N_Port) and D_ID (associated with a second N_Port). The stream object can be included as part of a traffic stream that includes multiple stream objects (which can be the same or different) and one or more parameters of the stream object can be user-configured through user interface 210D, such as the payload size of each frame, for example. Further, the stream object can be generated by the data engine 210 with reference to the profile configuration module 210B and stream table 210C and transmitted by the transmitter 214, for instance. In some embodiments, the fixed number of frames may be 32 frames, with the sequence count of each frame being anywhere from 0-31 depending on the position of the frame within the sequence. Of course, other frame numbers and sequence count numbering schemes can alternately or additionally be implemented.

The stream object is received at a first switch that routes the stream object towards the second N_Port. The first switch may route the frames to the second N_Port using a load-balancing hash algorithm. For instance, for each frame, the switch can hash the OX_ID, S_ID and D_ID and route the frame through a particular physical channel depending on the resulting hash value. Because all of the frames have the same OX_ID, S_ID and D_ID, the frames should be routed through the same physical channel, experience similar latencies, and arrive at the second N_Port in sequential order.

The second N_Port is included in a receiving load tester. In some embodiments, the receiving load tester and the transmitting load tester are the same load tester, such as in the pairport test topology 300B or multi-port test topology 300C of FIGS. 3B and 3C. Alternately or additionally, the receiving load tester can be different than the transmitting load tester, such as in the multi-load tester topology 300D of FIG. 3D.

After being routed by the first switch, the stream object can arrive at the second N_Port. Alternately or additionally, the stream object can be transmitted across one or more ISL links through one or more second switches before arriving at the second N_Port.

The method 400 continues with the receiving load tester receiving 404 all or a portion of the stream object at the second N_Port. This may include receiving one or more individual frames of the stream object in any order, including sequential order or non-sequential order. Alternately or additionally, one or more of the frames of the stream object may be dropped such that they are not received by the receiving load tester.

At step 406, the receiving load tester analyzes the frames of the stream object in real-time as they are received to determine whether any errors have occurred. This can include the HDC module 218 performing a CRC check and/or verifying the received frames against the expected frames. For instance, the HDC module 218 can compare the sequence count of each received frame against the expected sequence count. Thus, if the sequence count of subsequent frames compared to previous frames does not increment by one with each subsequent frame, starting from 0 to 31 in the present embodiment, the HDC module 218 determines that an out-of-order error has occurred.

Alternately or additionally, the HDC module 218 can keep track of all of the frames of the stream object that are received according to their sequence count, regardless of whether they are received in sequential order, in order to determine whether a dropped frame error has occurred. As already mentioned above, the determination of a dropped frame error can be made in response to any one of a variety of events. For instance, in the present embodiment if the receiving load tester receives the $32^{nd}$ frame (having sequence count 31) of the stream object before receiving one or more of the $1^{st}$ through $1^{st}$ frames, the HDC module 218 may determine that a dropped frame error has occurred. Alternately, if the receiving load tester receives the first frame of a subsequent stream object before receiving one or more frames of a previous stream object, the HDC module 218 may determine that a dropped frame error has occurred.

Alternately or additionally, the HDC module 218 can track the D_IDs of the received frames in order to determine whether a misdirected frame error has occurred. For instance, if the HDC module 218 encounters a frame with a D_ID that does not correspond to the second N_Port, the HDC module 218 may determine that a misdirected frame error has occurred.

Upon determining that an error has occurred, the receiving load tester records 408 the occurrence of the error. This can include incrementing a corresponding one of the counters 222 depending on the type of error that occurred. For example, for each out-of-order frame error the HDC module 218 can increment an out-of-order frame counter. Similarly, the HDC module 218 can increment a dropped frame counter or a misdirected frame counter for each dropped frame or misdirected frame identified by the HDC module 218.

According to some embodiments of the invention, the receiving load tester can additionally display information (e.g., via a peripheral monitor) regarding identified errors to a user to facilitate the user debugging the error. For instance, the receiving load tester can display the S_ID, D_ID, sequence count and/or OX_ID of the out-of-order, dropped, or misdirected frame that was the subject of the error determination.

Optionally, the method 400 can continue at step 400 by triggering 410 one or more analyzers to capture data associated with one or more errors identified in step 408. For instance, one or more analyzers can be operably connected inline between the transmitting load tester, the one or more switches, and the receiving load tester. The captured data can include the traffic going into the receiving F_Port(s) (or E_Port(s)) of one or more of the switches and/or the traffic coming out of the transmitting F_Port(s) (or E_Port(s)) of one or more of the switches. The captured data can then assist a user in debugging the system.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for testing a network with a network load tester that is coupled to at least one analyzer which is further coupled to a switch, the method comprising:
   receiving, at a first N_Port, a plurality of frames from the switch, at least a portion of the frames belonging to a first stream object characterized by a unique identifier, each frame characterized by a unique sequence count;
   analyzing the received frames in real-time to identify the occurrence of one or more errors;
   recording the occurrence of the one or more errors according to error type, the error types including out-of-order frame errors, dropped frame errors, and misdirected frame errors; and
   upon identifying the occurrence of an error, triggering the at least one analyzer to capture data to assist in debugging a problem in the network associated with the error, wherein the switch implements a load-balancing hash algorithm to route frames through the network based on the unique identifier and wherein characterization of each traffic stream object with the unique identifier is sufficient to cause the frames of each traffic stream to be routed along the same physical path of the network and experience similar latencies when the load-balancing hash algorithm is implemented properly.

2. The method of claim 1, wherein the at least one analyzer captures traffic going into the switch, traffic coming out of the switch, or both.

3. The method of claim 1, wherein an out-of-order frame error is identified when the frames are not received in sequential order based on their associated sequence counts.

4. The method of claim 1, wherein a dropped frame error is identified when at least one frame of the first stream object is not received prior to receiving a last frame of the first stream object.

5. The method of claim 1, wherein each of the frames is further characterized by a source identifier corresponding to a source N_Port from which the frames were sent and a destination identifier corresponding to a destination N_Port, and wherein a misdirected frame error is identified when the destination identifier of a frame received by the first N_Port corresponds to an N_Port other than the first N_Port.

6. The method of claim 1, further comprising, displaying information associated with an identified error to a user, the information including one or more of: a source identifier, destination identifier, sequence count, and originator exchange identifier associated with a corresponding out-of-order, dropped, or misdirected frame.

7. The method of claim 1, including analyzing the received frames in real-time to identify the occurrence of a plurality of errors having different error types and maintaining separate error counts for the out-of-order frame errors, for the dropped frame errors, and for the misdirected frame errors.

8. A network load tester for testing a system wherein the network load tester is coupled to a network analyzer which is further coupled to a switch, the network load tester comprising:
   a traffic stream table configured to store a stream record for each of a plurality of traffic streams, each traffic stream characterized by a unique identifier and including a fixed number of data frames;
   a traffic profile engine operably coupled to the traffic stream table and configured to generate a plurality of traffic profiles, each traffic profile including one or more traffic streams;
   a transmitter operably coupled to the traffic profile engine and configured to transmit one or more of the generated traffic profiles to the switch;
   a receiver configured to receive a traffic profile from the switch;
   a hardware data compare operably coupled to the receiver and configured to perform real-time error checking on the received traffic profile to identify one or more of: out-of-order frame errors, missing frame errors, and misdirected frame errors; and
   an event trigger operably coupled to the hardware data event compare and configured to trigger the network analyzer to capture data associated with an error identified by the hardware data compare to assist in identifying a faulty component in the system, the network analyzer being operably coupled inline between the switch and the receiver,
   wherein the switch implements a load-balancing hash algorithm to route frames through the network based on the unique identifier and wherein characterization of each traffic stream object with the unique identifier is sufficient to cause the frames of each traffic stream to be routed along the same physical path of the network and experience similar latencies when the load-balancing hash algorithm is implemented properly.

9. The network load tester of claim 8, further comprising a profile configuration module configured to store default parameters, user-configured parameters, or both, relating to each of the plurality of traffic profiles.

10. The network load tester of claim 9, wherein the parameters relating to each of the plurality of traffic profiles include one or more of: frame size, profile type, header, payload contents, error injection type, and error injection frequency.

11. The network load tester of claim 8, wherein the hardware data compare is configured to perform the real-time error checking at up to full line rate of the system.

12. The network load tester of claim 11, wherein the system includes a network that is substantially compliant with Fibre Channel standards.

13. The network load tester of claim 8, wherein performing the real-time error checking by the hardware data includes comparing data in the received traffic profile against expected data.

14. The network load tester of claim 8, wherein the hardware data compare is configured to identify out-of-order frame errors, missing frame errors, and misdirected frame errors, the network load tester further comprising a plurality of counters, each counter being configured to count a corresponding one of the out-of-order frame errors, the missing frame errors, and the misdirected frame errors.

15. A method of testing a network with at least a first load tester that is coupled to an analyzer which is further coupled to at least one Fibre Channel switch, the method comprising:
generating a first stream object characterized by a first unique identifier, the first stream object including a plurality of frames, each frame characterized by the same source identifier and destination identifier and a unique sequence count, the source identifier corresponding to a first port and the destination identifier corresponding to a second port;
transmitting the first stream object from the first port through the at least one Fibre Channel switch in the network;
receiving at least a portion of the first stream object at the second port;
checking the at least a portion of the first stream object for errors; and
when an error is encountered, recording the error according to error type and triggering an analyzer to capture at least one of: (1) data going into the Fibre Channel switch, and (2) data coming out of the Fibre Channel switch, to assist in identifying and debugging a problem in the network,
wherein the switch implements a load-balancing hash algorithm to route frames through the network based on the unique identifier and wherein characterization of each traffic stream object with the unique identifier is sufficient to cause the frames of each traffic stream to be routed along the same physical path of the network and experience similar latencies when the load-balancing hash algorithm is implemented properly.

16. The method of claim 15, wherein:
the first port is included in the first load tester and the second port is included in a second load tester; or
the first port and the second port are included in the first load tester.

17. The method of claim 15, wherein the first port and the second port are arranged with the at least one Fibre Channel switch in one or more of: a self-test port topology, a pairport test topology, and a multiport test topology.

18. The method of claim 15, further comprising counting each error according to error type, wherein the error types that are counted include out-of-order frame errors, missing frame errors, and misdirected frame errors.

* * * * *